(12) United States Patent
Jothimurugesan et al.

(10) Patent No.: US 10,010,877 B2
(45) Date of Patent: Jul. 3, 2018

(54) STABLE SUPPORT FOR FISCHER-TROPSCH CATALYST AND METHODS FOR MAKING AND USING

(71) Applicant: Chevron U.S.A. Inc., San Ramon, CA (US)

(72) Inventors: Kandaswamy Jothimurugesan, Hercules, CA (US); Howard Steven Lacheen, Richmond, CA (US); Mark Muraoka, Walnut Creek, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/182,093

(22) Filed: Jun. 14, 2016

(65) Prior Publication Data

US 2017/0354960 A1 Dec. 14, 2017

(51) Int. Cl.

| | | |
|---|---|---|
| *B01J 21/02* | (2006.01) |
| *B01J 21/04* | (2006.01) |
| *B01J 23/75* | (2006.01) |
| *B01J 27/198* | (2006.01) |
| *B01J 35/02* | (2006.01) |
| *C10G 2/00* | (2006.01) |
| *B01J 37/08* | (2006.01) |
| *B01J 37/16* | (2006.01) |
| *B01J 37/02* | (2006.01) |

(52) U.S. Cl.
CPC ......... *B01J 27/198* (2013.01); *B01J 37/0215* (2013.01); *B01J 37/08* (2013.01); *B01J 37/16* (2013.01); *C10G 2/333* (2013.01)

(58) Field of Classification Search
CPC ........ B01J 23/75; B01J 27/198; B01J 35/023; B01J 21/02; B01J 21/04; C10G 2/333
See application file for complete search history.

(56) References Cited

U.S. PATENT DOCUMENTS 4,416,803 A * 11/1983 Udovich ................ B01J 23/002
502/208
4,510,259 A * 4/1985 Udovich ................ C07C 51/215
502/170

(Continued)

*Primary Examiner* — Cam N. Nguyen
(74) *Attorney, Agent, or Firm* — Susan M. Abernathy (57) ABSTRACT

A process has been developed for preparing a Fischer-Tropsch catalyst precursor and a Fischer-Tropsch catalyst made from the precursor. The process includes preparing a catalyst precursor by contacting a boehmite material with a stabilizer containing vanadium-phosphorus. The boehmite material includes two or more different crystalline boehmites having the same average crystallite size to the nearest whole nanometer and having differing properties selected from surface area, pore volume, density and combinations thereof. The boehmite material is subjected to at least one heat treatment at a temperature of at least 500° C., either before or after the contacting step to obtain a stabilized catalyst support having a pore volume of at least 0.3 cc/g. A catalytic metal or a compound containing cobalt is applied to the stabilized catalyst support to form the catalyst precursor. Finally, the catalyst precursor is reduced to activate the catalyst precursor to obtain the Fischer Tropsch catalyst. The catalyst has enhanced hydrothermal stability as measured by losing no more than 6% of its pore volume when exposed to water vapor.

12 Claims, 1 Drawing Sheet

(56) References Cited

U.S. PATENT DOCUMENTS

| | | | | |
|---|---|---|---|---|
| 4,652,543 A * | 3/1987 | Edwards | ................ | B01J 23/002 |
| | | | | 423/305 |
| 4,732,885 A * | 3/1988 | Edwards | ................ | B01J 23/002 |
| | | | | 423/305 |
| 4,810,803 A * | 3/1989 | Edwards | ................ | B01J 23/002 |
| | | | | 549/259 |
| 4,824,819 A * | 4/1989 | Edwards | ................ | B01J 23/002 |
| | | | | 502/209 |
| 4,845,241 A * | 7/1989 | Edwards | ................ | B01J 23/002 |
| | | | | 549/259 |
| 4,861,738 A * | 8/1989 | Edwards | ................ | B01J 23/002 |
| | | | | 502/25 |
| 4,918,201 A * | 4/1990 | Edwards | ................. | B01J 23/22 |
| | | | | 549/259 |
| 6,740,621 B2 * | 5/2004 | Singleton | ................ | B01J 21/04 |
| | | | | 423/626 |
| 7,071,239 B2 * | 7/2006 | Ortego, Jr. | ............. | B01J 21/005 |
| | | | | 518/700 |
| 7,176,160 B2 * | 2/2007 | Espinoza | ................ | B01J 21/04 |
| | | | | 502/327 |
| 7,341,976 B2 | 3/2008 | Espinoza et al. | | |
| 7,449,496 B2 * | 11/2008 | Jin | ........................... | B01J 21/04 |
| | | | | 502/263 |
| 8,530,528 B2 * | 9/2013 | Allison | ................. | B01J 21/005 |
| | | | | 518/700 |
| 9,168,512 B1 | 10/2015 | Jothimurugesan | | |
| 9,192,921 B1 | 11/2015 | Jothimurugesan | | |
| 9,233,358 B1 | 1/2016 | Jothimurugesan | | |
| 9,233,360 B1 | 1/2016 | Jothimurugesan | | |

* cited by examiner

STABLE SUPPORT FOR FISCHER-TROPSCH CATALYST AND METHODS FOR MAKING AND USING

FIELD

The present disclosure relates generally to catalysts for use in Fischer-Tropsch processes in which synthesis gas is converted to hydrocarbon products, and more specifically to catalysts having improved hydrothermal stability having a stabilized support including a boehmite material.

BACKGROUND

Supported cobalt catalysts are commonly used in the Fischer-Tropsch synthesis (FTS) step in gas-to-liquid (GTL) processes due to their high activity and selectivity to heavy hydrocarbons. The performance of the cobalt catalysts is very important for the economics of the GTL process. The FTS process is typically performed in a three-phase slurry reactor. An important advantage of the slurry reactor over fixed bed reactors is the greatly improved heat removal capability and ease of temperature control.

Alumina is one of the most desirable catalyst supports. Due to its high surface area and good mechanical properties, the gamma form of alumina has been used widely in industry for many catalytic applications. However, in an acidic or alcohol containing reaction medium such as Fischer-Tropsch synthesis conditions to produce wax, or other reactions proceeding in aqueous medium such as alcohol, ether, and ester syntheses, an alumina support exhibits a stability problem. Alumina may dissolve or leach slowly in the reactor due to attacks of acid and alcohol byproducts in the reaction medium. Dissolution of alumina support in acid medium is detrimental in catalyst stability. The dissolution of the support may cause poor catalyst integrity and possible fines generation. Fines generation will hurt the subsequent filtration and post processing operations. High metal or metal compound content in a Fischer-Tropsch product is undesirable because such contaminants could have adverse effects for the Fischer-Tropsch process, such as causing reactor plugging or significantly reducing catalyst life. As a result, it is important that the product of the Fischer-Tropsch process be free of metal and other contaminants that could adversely affect its subsequent processing. Thus it is highly desirable to have an alumina catalyst support with much improved acid resistance.

The churning of the contents of the three-phase slurry reactor exerts a significant mechanical stress on the suspended catalysts, placing a high premium on their mechanical integrity to avoid attrition of the catalyst particles in the slurry. By attrition is meant physical breakdown of the catalyst particles caused by friction or grinding as a result of impact with other particles. The cobalt catalyst in the FTS slurry is additionally susceptible to hydrothermal attack that is inherent to the FTS process at conventional slurry conditions because of the presence of water at high temperatures. Such hydrothermal attack is particularly a factor on exposed and unprotected catalyst support material, resulting in weaker support material such that the catalyst is more susceptible to attrition. Such catalyst attrition can result in contamination of the produced heavy hydrocarbons (i.e., wax) with fines. It would be desirable to have a cobalt Fischer-Tropsch catalyst having improved hydrothermal stability for use in slurry reactors.

It would further be desirable to have a cobalt Fischer-Tropsch catalyst having improved catalytic activity.

SUMMARY

In one aspect, a process is provided for preparing a Fischer Tropsch catalyst having improved resistance to hydrothermal attack. The process includes preparing a catalyst precursor by contacting a boehmite material with a stabilizer containing vanadium-phosphorus. The boehmite material includes two or more different crystalline boehmites having the same average crystallite size to the nearest whole nanometer and having differing properties selected from surface area, pore volume, density and combinations thereof. The boehmite material is subjected to at least one heat treatment at a temperature of at least 500° C., either before or after the contacting step to obtain a stabilized catalyst support having a pore volume of at least 0.3 cc/g. A catalytic metal or a compound containing cobalt is applied to the stabilized catalyst support to form the catalyst precursor. Finally, the catalyst precursor is reduced to activate the catalyst precursor to obtain the Fischer Tropsch catalyst.

In another aspect, a Fischer Tropsch catalyst is provided that is prepared as described above.

In another aspect, a process is provided for Fischer Tropsch synthesis including contacting a gaseous mixture comprising carbon monoxide and hydrogen with the Fischer Tropsch catalyst prepared as described above at a pressure of from 0.1 to 3 MPa and a temperature of from 180 to 260° C. A product comprising $C_{5+}$ hydrocarbons is produced.

DESCRIPTION OF THE DRAWINGS

These and other objects, features and advantages of the present invention will become better understood with reference to the following description, appended claims and accompanying drawings where:

DETAILED DESCRIPTION

In one embodiment, a catalyst support containing boehmite material is modified with a vanadium-phosphorus containing stabilizer to minimize the undesirable effects of hydrothermal attack on FTS catalysts based on the support. The use of the modified catalyst support can reduce the occurrence of ultra-fine particles rich in active catalyst component contaminating the waxy hydrocarbon product of the FTS step in a GTL process. The modified catalyst support, also referred to herein as a Fischer-Tropsch catalyst precursor, is prepared according to the following process. Boehmite material is selected as the catalyst support material. The boehmite material includes two or more crystalline boehmites having the same average crystallite size. The two or more different crystalline boehmites have the same average crystallite size to the nearest whole nanometer. In one embodiment, the average crystallite size of the two or more different crystalline boehmites is from 2 nm to 35 nm. The two or more different crystalline boehmites have differing properties other than average crystallite size, such as, for instance, surface area, pore volume, density and combinations thereof.

The boehmite material is treated with the vanadium-phosphorus containing stabilizer to form the stable support. Vanadium and phosphorous are added to alumina by coimpregnation with different vanadium to phosphorus molar ratios. In one embodiment, ammonium metavanadate and phosphoric acid are dissolved in water. The solution can be heated to facilitate dissolution. The solution can then be added to the gamma alumina catalyst support material by any suitable method, e.g., incipient wetness impregnation method. In one embodiment, the molar ratio of vanadium to phosphorus in the solution is from 0.05 to 6.0, and even from 0.1 to 4.0. The combined amount of vanadium and phosphorus in the first solution can be from 1 to 10 weight percent. The modified catalyst support material can then be slowly dried, e.g., at a temperature of from 110° to 120° C. to spread the metals over the entire support. The drying step can be conducted in air.

The support is calcined at a temperature above 500° C., either before or after contacting the boehmite material with the vanadium-phosphorus containing stabilizer, to obtain a modified catalyst support. The modified stabilized catalyst support has a pore volume of at least 0.3 cc/g. In one embodiment, the catalyst support material is calcined at a temperature of at least 700° C. Calcination should be conducted by using a slow heating rate of, for example, 0.5° to 3° C. per minute or from 0.5° to 1° C. per minute, and the catalyst should be held at the maximum temperature for a period of between 1 and 20 hours.

The modified catalyst support can have a pore volume of at least 0.4 cc/g. The test for hydrothermal stability of the catalyst support is performed using a steaming test. The steaming test includes exposing 1-2 g of modified catalyst support to about 15-30 g of water for 2-20 hours in an autoclave at a temperature of 220-240° C. The modified catalyst support sample is cooled down to room temperature and then dried at 120° C. for 2 hours. Physical analyses are carried out on the modified support alumina support before and after the steam treatment. The modified catalyst support has been found to lose no more than 6% of its pore volume when exposed to water vapor.

The modified catalyst support is then contacted with a second solution that contains a precursor compound of an active cobalt catalyst component to obtain a FTS catalyst precursor. In one embodiment, the modified catalyst support is contacted with the second solution by impregnation, e.g., incipient wetness impregnation.

The impregnated catalyst is then dried. The impregnation using the second solution can be repeated as needed until the desired cobalt loading is achieved. Multiple impregnations are often needed to achieve the desired metal loading, with intervening drying and calcination treatments to disperse and decompose the metal salts. The second solution and support are stirred while evaporating the solvent at a temperature of from about 25° to about 50° C. until "dryness." The impregnated catalyst is slowly dried at a temperature of from about 110° to about 120° C. for a period of about 1 hour so as to spread the metals over the entire support. The drying step may be conducted at a very slow rate in air.

The dried catalyst may then be reduced or it may be calcined first. The dried catalyst is calcined by heating slowly in flowing air, for example 10 cc/gram/minute, to a temperature in the range of from about 200° to about 350° C., for example, from about 250° to about 300° C., that is sufficient to decompose the metal salts and fix the metals. The aforesaid drying and calcination steps can be done separately or can be combined. However, calcination should be conducted by using a slow heating rate of, for example, 0.5° to about 3° C. per minute or from about 0.5° to about 1° C. per minute and the catalyst should be held at the maximum temperature for a period of about 1 to about 20 hours, for example, for about 2 hours.

The foregoing impregnation steps are repeated with additional solutions in order to obtain the desired metal loading, i.e., from 5 wt % to 45 wt % cobalt, even from 20 wt % to 35 wt % cobalt. Metal promoters can be added with the FT component, but they may be added in other impregnation steps, separately or in combination, before, after or between impregnations of FT component. In one embodiment, the catalyst precursor further contains a promoter selected from the group consisting of platinum, ruthenium, silver, palladium, lanthanum, cerium and combinations thereof. The promoter can be added to the second solution or to a subsequent solution, and applied to the modified catalyst support by impregnation. The catalyst precursor can contain the promoter in an amount from 0.01 wt % to 5 wt %.

A Fischer-Tropsch catalyst can then be prepared from the catalyst precursor by reducing the catalyst precursor to activate the catalyst precursor. In one embodiment, the catalyst precursor is placed in a tube reactor in a muffle furnace. The tube can be purged first with nitrogen gas at ambient temperature, after which time the gas feed can be changed to pure hydrogen. The temperature to the reactor can be increased, for example, to 450° C. at a rate of 1° C./minute and then held at that temperature for ten hours. After this time, the gas feed can be switched to nitrogen to purge the system and the unit can be cooled to ambient temperature. Then a gas mixture of 1 volume % $O_2/N_2$ can be passed up through the catalyst bed at 750 sccm for 10 hours to passivate the catalyst.

Advantageously, the Fischer-Tropsch catalyst prepared as described herein loses no more than about 6%, of its pore volume when exposed to water vapor. In one embodiment, the catalyst loses not more than 6% its pore volume when the catalyst is contacted with a feed stream at a temperature greater than 200° C. in the presence of water.

In one embodiment, a process of Fischer Tropsch synthesis is conducted by contacting a gaseous mixture comprising carbon monoxide and hydrogen with the Fischer-Tropsch catalyst prepared as disclosed herein at a pressure of from 0.1 to 3 MPa and a temperature of from 180 to 260° C. The FTS process can occur in a slurry reactor or a continuously stirred tank reactor. The resulting product contains $C_{5+}$ hydrocarbons.

EXAMPLES

Comparative Example 1A

Versal V-250 boehmite (obtained from UOP LLC, Des Plaines, Ill.), having an average crystallite size of 3 nm, was dispersed in deionized water to achieve a solid content of about 20% by weight of the solution. The slurry was subsequently spray dried to form spherical granules. The spray dried material was further treated in an oven at 120° C. overnight. Finally, the dried alumina support was calcined at 750° C. for 2 hours in a muffle furnace to obtain gamma alumina.

Comparative Example 1B

Vanadium and phosphorous were supported on the gamma alumina obtained in Example 1A by impregnation with vanadium and phosphorous having a molar ratio of 1.2. $NH_4VO_3$ (obtained from Sigma-Aldrich, St. Louis, Mo.) was added to distilled water and then phosphoric acid (obtained from Sigma-Aldrich, St. Louis, Mo.) was added to the vanadium solution. The solution was stirred for 1 h at 70° C. The solution was cooled to room temperature and added to the gamma alumina support by incipient wetness impregnation method. The material was then dried in an oven at 120° C. overnight. Finally, the dried modified alumina support was calcined at 750° C. for 2 hours in a muffle furnace.

Comparative Example 1C

A three-step incipient wetness impregnation method was used to prepare a Fischer-Tropsch catalyst. A solution was prepared by dissolving cobalt (II) nitrate hexahydrate (obtained from Sigma-Aldrich), tetraammineplatinum (II) nitrate (obtained from Alfa Aesar, Ward Hill, Mass.) and lanthanum (III) nitrate hexahydrate (obtained from Sigma-Aldrich) and a glutaric acid (obtained from Sigma-Aldrich) in water. Modified alumina from Example 1B was impregnated by using one-third of the solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 25 wt % Co, 0.04% Pt and 1 wt % $La_2O_3$ and 73.96 wt % alumina. Properties of the supports and the catalysts are shown in Table 1

Comparative Example 2A

PB950 boehmite (obtained from obtained from Pacific Industrial Development Corporation, Ann Arbor, Mich.), having an average crystallite size of 3 nm, was dispersed in deionized water to achieve a solid content of about 20% by weight of the solution. The slurry was subsequently spray dried to form spherical granules. The spray dried material was further treated in an oven at 120° C. overnight. Finally, the dried alumina support was calcined at 750° C. for 2 hours in a muffle furnace to obtain gamma alumina.

Comparative Example 2B

Vanadium and phosphorous were supported on the gamma alumina obtained in Example 2A by impregnation with vanadium and phosphorous having a molar ratio of 1.2. $NH_4VO_3$ (obtained from Sigma-Aldrich) was added to distilled water and then phosphoric acid (obtained from Sigma-Aldrich) was added to the vanadium solution. This solution was stirred for 1 h at 70° C. The solution was cooled to room temperature and added to the gamma alumina support by incipient wetness impregnation method. The material was then dried in an oven at 120° C. overnight. Finally, the dried modified alumina support was calcined at 750° C. for 2 hours in a muffle furnace.

Comparative Example 2C

A three-step incipient wetness impregnation method was used to prepare a Fischer-Tropsch catalyst. A solution was prepared by dissolving cobalt (II) nitrate hexahydrate (obtained from Sigma-Aldrich), tetraammineplatinum (II) nitrate (obtained from Alfa Aesar) and lanthanum (III) nitrate hexahydrate (obtained from Sigma-Aldrich) and a glutaric acid (obtained from Sigma-Aldrich) in water. Modified alumina from Example 2B was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 25 wt % Co, 0.04% Pt and 1 wt % $La_2O_3$ and 73.96 wt % alumina.

Example 3A

80% of PB950 boehmite (obtained from obtained from Pacific Industrial Development Corporation), and 20% Versal V-250 boehmite (obtained from UOP LLC), each having an average crystallite size of 3 nm, were dispersed in deionized water to achieve a solid content of about 20% by weight of the solution. The slurry was subsequently spray dried to form spherical granules. The spray dried material was further treated in an oven at 120° C. overnight. Finally, the dried alumina support was calcined at 750° C. for 2 hours in a muffle furnace to obtain gamma alumina.

Example 3B

Vanadium and phosphorous were supported on the gamma alumina obtained in Example 3A by impregnation with vanadium and phosphorous having a molar ratio of 1.2. $NH_4VO_3$ (obtained from Sigma-Aldrich) was added to distilled water and then phosphoric acid (obtained from Sigma-Aldrich, St. Louis, Mo.) was added to the vanadium solution. This solution was stirred for 1 h at 70° C. The solution was cooled to room temperature and added to the gamma alumina support by incipient wetness impregnation method. The material was then dried in an oven at 120° C. overnight. Finally, the dried modified alumina support was calcined at 750° C. for 2 hours in a muffle furnace.

Example 3C

A three-step incipient wetness impregnation method was used to prepare a Fischer-Tropsch catalyst. A solution was prepared by dissolving cobalt (II) nitrate hexahydrate (obtained from Sigma-Aldrich), tetraammineplatinum (II) nitrate (obtained from Alfa Aesar) and lanthanum (III) nitrate hexahydrate (obtained from Sigma-Aldrich) and a glutaric acid (obtained from Sigma-Aldrich) in water. Modified alumina from Example 3B was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 25 wt % Co, 0.04% Pt and 1 wt % $La_2O_3$ and 73.96 wt % alumina.

Example 4A

80% of PB950 boehmite (obtained from obtained from Pacific Industrial Development Corporation), and 20% Versal V-250 boehmite (obtained from UOP LLC), each having an average crystallite size of 3 nm, were dispersed in deionized water to achieve a solid content of about 20% by weight of the solution. $NH_4VO_3$ (obtained from Sigma-Aldrich) and phosphoric acid (obtained from Sigma-Aldrich) were dissolved in deionized water. The molar ratio of vanadium to phosphorous was 1.2. This solution was stirred for 1 h at 70° C. The solution was then cooled to room temperature and added to the above boehmite slurry. The slurry was subsequently spray dried to form spherical granules. The spray dried material was further treated in an oven at 120° C. overnight. Finally, the dried modified alumina support was calcined at 750° C. for 2 hours in a muffle furnace.

Example 4B

A three-step incipient wetness impregnation method was used to prepare a Fischer-Tropsch catalyst. A solution was prepared by dissolving cobalt (II) nitrate hexahydrate (obtained from Sigma-Aldrich), tetraammineplatinum (II) nitrate (obtained from Alfa Aesar) and lanthanum (III) nitrate hexahydrate (obtained from Sigma-Aldrich) and a glutaric acid (obtained from Sigma-Aldrich) in water. Modified alumina from Example 3B was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 25 wt % Co, 0.04% Pt and 1 wt % $La_2O_3$ and 73.96 wt % alumina.

tilled water and then phosphoric acid (obtained from Sigma-Aldrich, St. Louis, Mo.) was added to the vanadium solution. This solution was stirred for 1 h at 70° C. The solution was then cooled to room temperature and added to the gamma alumina support by incipient wetness impregnation method. The material was then dried in an oven at 120° C. overnight. Finally, the dried modified alumina support was calcined at 750° C. for 2 hours in a muffle furnace.

Comparative Example 5C

A three-step incipient wetness impregnation method was used to prepare the Fischer-Tropsch catalyst. A solution was prepared by dissolving cobalt (II) nitrate hexahydrate (obtained from Sigma-Aldrich), tetraammineplatinum (II) nitrate (obtained from Alfa Aesar) and lanthanum (III) nitrate hexahydrate (obtained from Sigma-Aldrich) and a glutaric acid (obtained from Sigma-Aldrich), in water. Modified alumina from Example 5B was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 25 wt % Co, 0.04% Pt and 1 wt % $La_2O_3$ and 73.96 wt % alumina. Properties of the supports and the catalysts are shown in Table 2.

TABLE 1

| Ex. | Boehmite | Stabilizer | Catalyst Composition | BET Surface Area, $m^2$/g | PV cc/g | Average Pore Diameter, nm | XRD, Average Crystallite size of $Co_3O_4$, nm |
|---|---|---|---|---|---|---|---|
| 1A | V-250 | — | — | 215.7 | 0.8457 | 15.6822 | — |
| 1B | V-250 | V-P | — | 193.1 | 0.7321 | 15.1644 | — |
| 1C | V-250 | V-P | 25Co/0.05Pt/1$La_2O_3$ | 121.6 | 0.4158 | 13.6806 | 13 |
| 2A | PB950 | — | — | 182.6 | 0.3918 | 8.5822 | — |
| 2B | PB950 | V-P | — | 164.1 | 0.3304 | 8.0512 | — |
| 2C | PB950 | V-P | 25Co/0.05Pt/1$La_2O_3$ | 97.8 | 0.1587 | 6.4905 | 11 |
| 3A | 80% PB950 + 20% V250 | — | — | 187.1 | 0.4780 | 10.2180 | — |
| 3B | 80% PB950 + 20% V250 | V-P | — | 170.2 | 0.4152 | 9.7551 | — |
| 3C | 80% PB950 + 20% V250 | V-P | 25Co/0.05Pt/1$La_2O_3$ | 103.2 | 0.2084 | 8.0704 | 12 |
| 4A | 80% PB950 + 20% V250 | V-P | — | 195.6 | 0.4265 | 8.7202 | — |
| 4B | 80% PB950 + 20% V250 | V-P | 25Co/0.05Pt/1$La_2O_3$ | 123.8 | 0.2447 | 7.9049 | 14 |

Comparative Example 5A

Pural TH 80 boehmite (obtained from Sasol North America Inc, Houston, Tex.), having an average crystallite size of 10 nm, was dispersed in deionized water to achieve a solid content of about 20% by weight of the solution. The slurry was subsequently spray dried to form spherical granules. The spray dried material was further treated in an oven at 120° C. overnight. Finally, the dried alumina support was calcined at 750° C. for 2 hours in a muffle furnace to obtain gamma alumina.

Comparative Example 5B

Vanadium and phosphorous were supported on the gamma alumina obtained in Example 5A by impregnation with vanadium and phosphorous having a molar ratio of 1.2. $NH_4VO_3$ (obtained from Sigma-Aldrich) was added to dis- Comparative Example 6A Pural NG boehmite (obtained from Sasol North America Inc), having an average crystallite size of 10 nm, was dispersed in deionized water to achieve a solid content of about 20% by weight of the solution. The slurry was subsequently spray dried to form spherical granules. The spray dried material was then further treated in an oven at 120° C. overnight. Finally, the dried alumina support was calcined at 750° C. for 2 hours in a muffle furnace to obtain the gamma alumina.

Comparative Example 6B

Vanadium and phosphorous were supported on the alumina obtained in Example 6A by impregnation with vanadium and phosphorous having a molar ratio of 1.2. $NH_4VO_3$ (obtained from Sigma-Aldrich) was added to distilled water, and then phosphoric acid (obtained from Sigma-Aldrich) was added to the vanadium solution. This solution was stirred for 1 h at 70° C. The solution was then cooled to room temperature and added to the gamma alumina support by incipient wetness impregnation method. The material was then dried in an oven at 120° C. overnight. Finally, the dried modified alumina support was calcined at 750° C. for 2 hours in a muffle furnace.

Comparative Example 6C

A three-step incipient wetness impregnation method was used to prepare a Fischer-Tropsch catalyst. A solution was prepared by dissolving cobalt (II) nitrate hexahydrate (obtained from Sigma-Aldrich), tetraammineplatinum (II) nitrate (obtained from Alfa Aesar) and lanthanum (III) nitrate hexahydrate (obtained from Sigma-Aldrich) and a glutaric acid (obtained from Sigma-Aldrich) in water. Modified alumina from Example 6B was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 25 wt % Co, 0.04% Pt and 1 wt % $La_2O_3$ and 73.96 wt % alumina.

Example 7A

80% of Pural NG boehmite (obtained from Sasol North America Inc), and 20% TH80 boehmite (obtained from Sasol), each having an average crystallite size of 10 nm, were dispersed in deionized water to achieve a solid content of about 20% by weight of the solution. The slurry was subsequently spray dried to form spherical granules. The spray dried material was then further treated in an oven at 120° C. overnight. Finally, the dried alumina support was calcined at 750° C. for 2 hours in a muffle furnace to obtain gamma alumina.

Example 7B

Vanadium and phosphorous were supported on the gamma alumina obtained in Example 7A by impregnation with vanadium and phosphorous having a molar ratio of 1.2. $NH_4VO_3$ (obtained from Sigma-Aldrich) was added to distilled water and then phosphoric acid (obtained from Sigma-Aldrich, St. Louis, Mo.) was added to the vanadium solution. This solution was stirred for 1 h at 70° C. The solution was then cooled to room temperature and added to the gamma alumina support by incipient wetness impregnation method. The material was then dried in an oven at 120° C. overnight. Finally, the dried modified alumina support was calcined at 750° C. for 2 hours in a muffle furnace.

Example 7C

A three-step incipient wetness impregnation method was used to prepare a Fischer-Tropsch catalyst. A solution was prepared by dissolving cobalt (II) nitrate hexahydrate (obtained from Sigma-Aldrich), tetraammineplatinum (II) nitrate (obtained from Alfa Aesar) and lanthanum (III) nitrate hexahydrate (obtained from Sigma-Aldrich) and a glutaric acid (obtained from Sigma-Aldrich) in water. Modified alumina from Example 7B was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 25 wt % Co, 0.04% Pt and 1 wt % $La_2O_3$ and 73.96 wt % alumina.

Example 8A

80% of Pural NG boehmite (obtained from Sasol), and 20% TH 80 boehmite (obtained from Sasol), each having an average crystallite size of 10 nm, were dispersed in deionized water to achieve a solid content of about 20% by weight of the solution. $NH_4VO_3$ (obtained from Sigma-Aldrich, St. Louis, Mo.) and phosphoric acid (obtained from Sigma-Aldrich, St. Louis, Mo.) were dissolved in deionized water. Vanadium to phosphorous molar ratio was 1.2. This solution was stirred for 1 h at 70° C. The solution was then cooled to room temperature and added to the above boehmite slurry. The slurry was subsequently spray dried to form spherical granules. The spray dried material was then further treated in an oven at 120° C. overnight. Finally, the dried modified alumina support was calcined at 750° C. for 2 hours in a muffle furnace.

Example 8B

A three-step incipient wetness impregnation method was used to prepare a Fischer-Tropsch catalyst. A solution was prepared by dissolving cobalt (II) nitrate hexahydrate (obtained from Sigma-Aldrich), tetraammineplatinum (II) nitrate (obtained from Alfa Aesar) and lanthanum (III) nitrate hexahydrate (obtained from Sigma-Aldrich) and a glutaric acid (obtained from Sigma-Aldrich) in water. Modified alumina from Example 8A was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 25 wt % Co, 0.04% Pt and 1 wt % $La_2O_3$ and 73.96 wt % alumina.

TABLE 2

| Ex. | Boehmite | Stabilizer | Catalyst Composition | BET Surface Area, $m^2/g$ | PV cc/g | Average Pore Diameter, nm | XRD |
|---|---|---|---|---|---|---|---|
| 5A | TH80 | — | — | 139.4 | 0.7402 | 21.2300 | — |
| 5B | TH80 | V-P | — | 134.8 | 0.6393 | 18.9647 | — |
| 5C | TH80 | V-P | 25Co/0.05Pt/1$La_2O_3$ | 93.1 | 0.3594 | 15.4381 | 12 |

TABLE 2-continued

| Ex. | Boehmite | Stabilizer | Catalyst Composition | BET Surface Area, m²/g | PV cc/g | Average Pore Diameter, nm | XRD |
|---|---|---|---|---|---|---|---|
| 6A | Pural NG | — | — | 126.9 | 0.3650 | 11.5024 | — |
| 6B | Pural NG | V-P | — | 124.6 | 0.3251 | 10.4332 | — |
| 6C | Pural NG | V-P | 25Co/0.05Pt/1La₂O₃ | 73.8 | 0.1556 | 8.4338 | 11 |
| 7A | 80% Pural NG + 20% TH80 | — | — | 138.9 | 0.4406 | 12.6883 | — |
| 7B | 80% Pural NG + 20% TH80 | V-P | — | 130.2 | 0.3807 | 11.6959 | — |
| 7C | 80% Pural NG + 20% TH80 | V-P | 25Co/0.05Pt/1La₂O₃ | 85.0 | 0.1943 | 9.1401 | 11 |
| 8A | 80% Pural NG + 20% TH80 | V-P | — | 158.3 | 0.4539 | 11.4657 | — |
| 8B | 80% Pural NG + 20% TH80 | V-P | 25Co/0.05Pt/1La₂O₃ | 92.0 | 0.2351 | 10.2181 | 10 |

Hydrothermal Stability of Alumina Supports

Characterization of the hydrothermal stability of the alumina supports was conducted using 2 grams of each of the catalysts studied into contact with 15 g of water at 220° C. for 2 hours in an autoclave in a static mode under autogenous pressure. The support sample was cooled down to room temperature and then dried at 120° C. for 2 hours. Two samples (before and after steaming) were then analyzed for change in pore volume. Pore volume of support samples were determined from nitrogen adsorption/desorption isotherms measured at −196° C. using a Tristar analyzer available from Micromeritics Instrument Corporation (Norcross, Ga.). Prior to gas adsorption measurements, the catalyst samples were degassed at 190° C. for 4 hours. Table 3 shows the relative percentage change in pore volume, as calculated by the following formula:

% change=(pore volume before steam test−pore volume after steam test)/(pore volume before steam test)

From Table 3 it is evident that the modified mixed boehmite supports lost no more than 6% of pore volume when exposed to water vapor (steam), less than the comparative examples. The Fischer-Tropsch catalyst made using the modified mixed boehmite supports would likewise also be expected to lost no more than 6% of pore volume when exposed to water vapor.

TABLE 3

| | Pore Volume, cc/g | | |
|---|---|---|---|
| Example Number | Before steaming | After steaming | % Change |
| Comparative Example 5A | 0.7402 | 0.0604 | 91.8 |
| Comparative Example 5B | 0.6393 | 0.5831 | 8.8 |
| Comparative Example 6A | 0.3650 | 0.1803 | 50.6 |
| Comparative Example 6B | 0.3251 | 0.3024 | 7.0 |
| Example 7A | 0.4406 | 0.2340 | 46.9 |
| Example 7B | 0.3807 | 0.3586 | 5.8 |
| Example 8A | 0.4539 | 0.4283 | 5.6 |

Figure 1:
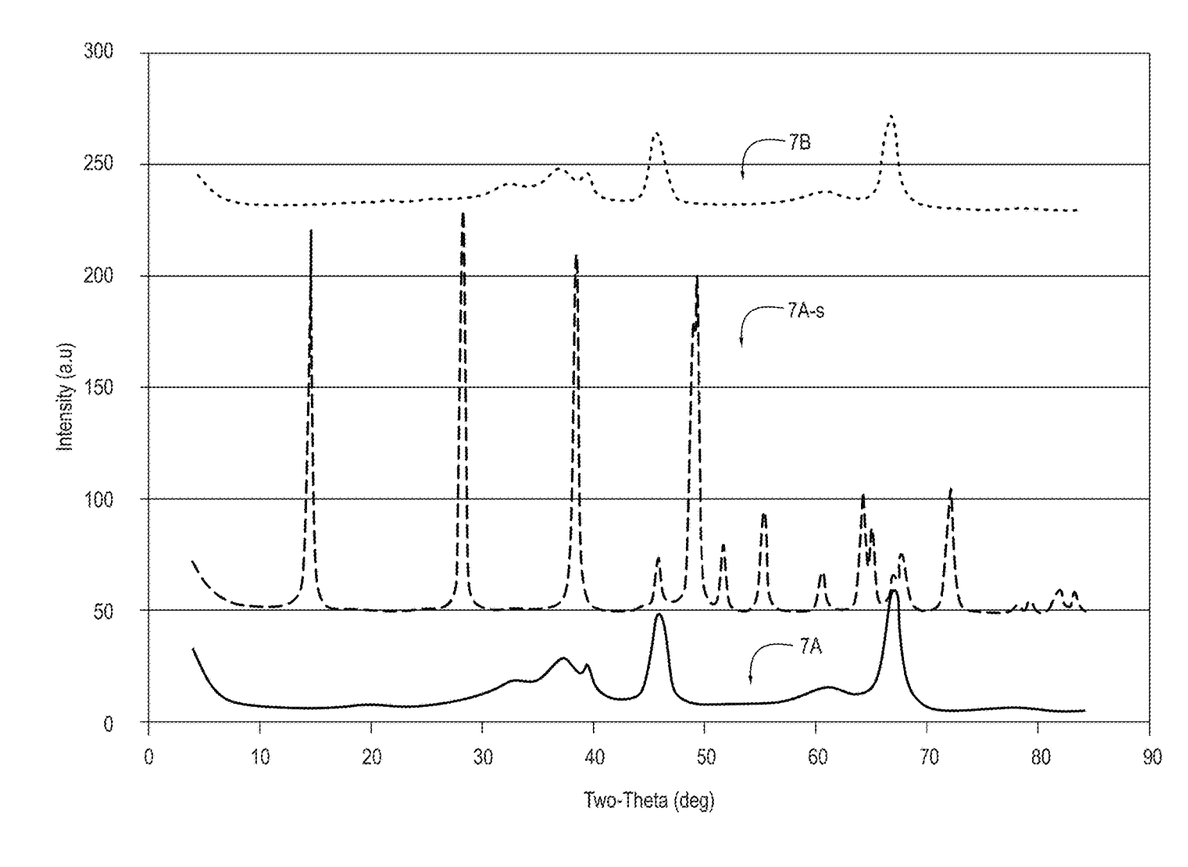
FIG. 1 is a graph illustrating XRD results of catalyst supports before and after steaming according to one exemplary embodiment.

X-ray diffraction (XRD) results of the alumina supports of Examples 7A and 7B before and after steaming are shown in FIG. 1. The comparative XRD results in FIG. 1 show that the unmodified gamma alumina of the comparative examples was completely transformed to boehmite after steam treatment. However, the XRD pattern of the vanadium-phosphorus modified alumina of the examples after the same steam treatment shows a maintained gamma alumina pattern.

Catalyst Activation

Twenty grams of each catalyst prepared as described above were charged to a glass tube reactor. The reactor was placed in a muffle furnace with upward gas flow. The tube was purged first with nitrogen gas at ambient temperature, after which time the gas feed was changed to pure hydrogen with a flow rate of 750 sccm. The temperature to the reactor was increased to 350° C. at a rate of 1° C./minute and then held at that temperature for ten hours. After this time, the gas feed was switched to nitrogen to purge the system and the unit was then cooled to ambient temperature. Then a gas mixture of 1 volume % $O_2/N_2$ was passed up through the catalyst bed at 750 sccm for 10 hours to passivate the catalysts. No heating was applied, but the oxygen chemisorption and partial oxidation exotherm caused a momentary temperature rise. After 10 hours, the gas feed was changed to pure air, the flow rate was lowered to 200 sccm and then kept for two hours. Finally, the catalysts were discharged from the glass tube reactor.

A 1 liter continuous flow stirred-tank reactor (CSTR) was used for the slurry Fischer-Tropsch synthesis (FTS). The catalysts were transferred to the CSTR unit to mix with 300 g of Sasolwax® C80 Fischer-Tropsch wax obtained from Sasol Wax North America Corp., Hayward, Calif. The catalysts were flushed with nitrogen for a period of two hours, after which time the gas feed was switched to pure hydrogen at a flow rate of 500 sccm. The temperature was slowly raised to 120° C. at a temperature interval of 1° C./minute, held there for a period of one hour, then raised to 250° C. at a temperature interval of 1° C./minute and held at that temperature for 10 hours. After this time, the catalysts were cooled to 180° C. while remaining under a flow of pure hydrogen gas.

Fischer-Tropsch Activity

Catalysts prepared and activated as described above were each subjected to a synthesis run in which the catalysts were contacted with syngas containing hydrogen and carbon monoxide. Experimental conditions and results are given in Table 4.

TABLE 4

|  | Comparative Example 5C | Comparative Example 6C | Example 7C | Example 8B |
|---|---|---|---|---|
| Run Conditions |  |  |  |  |
| Temperature, ° C. | 230 | 230 | 230 | 230 |
| Pressure, psig | 280 | 280 | 280 | 280 |
| Space Velocity, cc/g/h | 8000 | 8000 | 8000 | 8000 |
| $H_2$/CO ratio | 1.6 | 1.6 | 1.6 | 1.6 |
| Results |  |  |  |  |
| CO Conversion, (mol, %) | 46.6 | 45.2 | 50.4 | 48.1 |
| $C_{5+}$ Productivity, g/g/h | 0.665 | 0.651 | 0.720 | 0.699 |
| Selectivity, mol % |  |  |  |  |
| $CH_4$ | 5.7 | 4.5 | 4.8 | 4.7 |
| $C_2$ | 0.8 | 0.7 | 0.8 | 0.6 |
| $C_3$ | 2.2 | 2.3 | 2.5 | 1.9 |
| $C_4$ | 2.7 | 2.5 | 2.8 | 2.4 |
| $C_{5+}$ | 87.4 | 88.1 | 87.5 | 88.9 |
| $CO_2$ | 0.2 | 1.6 | 1.6 | 1.4 |

It can be seen from Table 4 that the performance of the catalyst prepared using the modified mixed boehmite supports showed improved CO conversion and productivity as compared to the comparative examples.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

It is claimed:

1. A process for preparing a Fischer-Tropsch catalyst having improved resistance to hydrothermal attack, comprising:
   a. preparing a catalyst precursor according to a process comprising:
      i. contacting a boehmite material with a stabilizer comprising vanadium-phosphorus, wherein the boehmite material comprises two or more different crystalline boehmites having the same average crystallite size to the nearest whole nanometer and having differing properties selected from the group consisting of surface area, pore volume, density and combinations thereof;
      ii. subjecting the boehmite material to at least one heat treatment at a temperature of at least 500° C., either before or after contacting the boehmite material with the stabilizer, to obtain a stabilized catalyst support having a pore volume of at least 0.3 cc/g; and
      iii. applying a catalytic metal or a compound thereof to said stabilized catalyst support to form the catalyst precursor, wherein the catalytic metal comprises cobalt; and
   b. reducing the catalyst precursor to activate the catalyst precursor to obtain the Fischer-Tropsch catalyst;
   wherein the Fischer-Tropsch catalyst loses not more than 6% of its pore volume when the Fischer-Tropsch catalyst is contacted with a feed stream at a temperature greater than 200° C. in the presence of a water vapor.

2. The process of claim 1, wherein the two or more different crystalline boehmites have an average crystallite size of from 2 nm to 35 nm.

3. The process of claim 1, wherein the stabilizer comprises vanadium and phosphorus at a molar ratio of vanadium to phosphorus of from 0.05 to 6.0.

4. The process of claim 1, additionally comprising exposing the Fischer-Tropsch catalyst to the water vapor, and wherein the Fischer-Tropsch catalyst loses not more than 5.8% of its pore volume when exposed to the water vapor.

5. A Fischer-Tropsch catalyst prepared according to the process of claim 1, wherein the Fischer-Tropsch catalyst shows improved CO conversion and increased productivity of $C_{5+}$ hydrocarbons compared to a comparative catalyst made with an unmixed boehmite material.

6. The Fischer-Tropsch catalyst of claim 5, wherein the two or more different crystalline boehmites have an average crystallite size of from 2 nm to 35 nm.

7. The Fischer-Tropsch catalyst of claim 5, wherein Fischer-Tropsch catalyst loses not more than 5.8% of its pore volume when exposed to the water vapor.

8. The Fischer-Tropsch catalyst of claim 5, wherein the Fischer-Tropsch catalyst comprises $Co_3O_4$ crystallites having an average size of no greater than 20 nm.

9. The Fischer-Tropsch catalyst of claim 5, wherein the Fischer-Tropsch catalyst comprises $Co_3O_4$ crystallites having an average size of from 6 to 20 nm.

10. The Fischer-Tropsch catalyst of claim 5, wherein the stabilizer comprises vanadium and phosphorus at a molar ratio of vanadium to phosphorus of from 0.05 to 6.0.

11. A process of Fischer-Tropsch synthesis comprising contacting a gaseous mixture comprising carbon monoxide and hydrogen with the Fischer-Tropsch catalyst of claim 5 at a pressure of from 0.1 to 3 MPa and a temperature of from 180 to 260° C., thereby producing a product comprising the $C_{5+}$ hydrocarbons.

12. The Fischer-Tropsch catalyst of claim 5, comprising the stabilized catalyst support and from 5 wt % to 45 wt % of the cobalt.

* * * * *

UNITED STATES PATENT AND TRADEMARK OFFICE
CERTIFICATE OF CORRECTION

PATENT NO. : 10,010,877 B2
APPLICATION NO. : 15/182093
DATED : July 3, 2018
INVENTOR(S) : Kandaswamy Jothimurugesan, Howard Steven Lacheen and Mark Muraoka

Page 1 of 1

It is certified that error appears in the above-identified patent and that said Letters Patent is hereby corrected as shown below:

On the Title Page

Item (74) should read as follows:
Susan M. Abernathy
Karen R. DiDomenicis

Signed and Sealed this
Eighteenth Day of June, 2019

Andrei Iancu
*Director of the United States Patent and Trademark Office*